United States Patent
Bellato et al.

(10) Patent No.: US 8,849,116 B2
(45) Date of Patent: Sep. 30, 2014

(54) METHOD FOR DATA TRANSMISSION IN AN OPTICAL TRANSPORT NETWORK

(75) Inventors: Alberto Bellato, Bermareggio (IT);
Pietro Vittorio Grandi, Milan (IT);
Matteo Gumier, Sesto Calende (IT);
Sergio Belotti, Vimercate (IT); Stephen John Trowbridge, Boulder, CO (US)

(73) Assignee: Alcatel Lucent, Boulogne Billancourt (FR)

( * ) Notice: Subject to any disclaimer, the term of this patent is extended or adjusted under 35 U.S.C. 154(b) by 486 days.

(21) Appl. No.: 13/254,891

(22) PCT Filed: Mar. 9, 2010

(86) PCT No.: PCT/EP2010/052998
§ 371 (c)(1),
(2), (4) Date: Sep. 6, 2011

(87) PCT Pub. No.: WO2010/103018
PCT Pub. Date: Sep. 16, 2010

(65) Prior Publication Data
US 2012/0002965 A1   Jan. 5, 2012

(30) Foreign Application Priority Data
Mar. 9, 2009   (EP) ..................................... 09425094

(51) Int. Cl.
*H04J 3/16*      (2006.01)
(52) U.S. Cl.
CPC ............. *H04J 3/1652* (2013.01); *H04J 3/1658* (2013.01)

USPC .................................. 398/52; 398/75; 398/98

(58) Field of Classification Search
CPC ............. H04J 14/08; H04J 2203/0008; H04Q 3/0066; H04Q 2011/0033
USPC .......................................... 398/35, 52, 75, 98
See application file for complete search history.

(56) References Cited

U.S. PATENT DOCUMENTS

| | | | |
|---|---|---|---|
| 6,965,619 B2 * | 11/2005 | Bisson et al. .................. | 370/543 |
| 2003/0048813 A1 * | 3/2003 | Lahav et al. .................. | 370/537 |
| 2003/0117952 A1 * | 6/2003 | Ueno et al. .................... | 370/228 |
| 2007/0104485 A1 * | 5/2007 | Zhang ............................. | 398/69 |
| 2007/0248121 A1 * | 10/2007 | Zou ................................ | 370/498 |
| 2008/0037581 A1 * | 2/2008 | Asano ............................ | 370/466 |

FOREIGN PATENT DOCUMENTS

| | | |
|---|---|---|
| EP | 1657839 | 5/2006 |
| WO | WO2008122218 | 10/2008 |
| WO | WO2009046596 | 4/2009 |

* cited by examiner

*Primary Examiner* — Dzung Tran
(74) *Attorney, Agent, or Firm* — Carmen Patti Law Group, LLC

(57) ABSTRACT

An exemplary method and apparatus are provided for data transmission in an optical transport network that includes receiving client data from a client, mapping the client data into a frame structure, mapping the frame structure into tributary slots of a data transport structure, and transmitting the data transport structure. The data transport structure contains a fixed number of tributary slots and the size of the frame structure is selectable in granularity of the tributary slots of the data transport structure.

16 Claims, 9 Drawing Sheets

Fig. 7a

| client data | | | | | | | |
|---|---|---|---|---|---|---|---|
| GFP | | idle | | | | | |
| ODU flex | | | | | | | |
| MP | | | | | | | |
| TSO | TSO | TSO | TS | TS | TS | TS | TS |
| HO-ODU | | | | | | | |

Fig. 7b

| client data | | | | | | | |
|---|---|---|---|---|---|---|---|
| GFP | | idle | | | | | |
| ODU flex | | | | | | | |
| MP | | | MP stuffing | | | | |
| TSO | TSO | TSO | TSO+ | TSO+ | TS | TS | TS |
| HO-ODU | | | | | | | |

Fig. 7c

| client data | | | | | | | |
|---|---|---|---|---|---|---|---|
| GFP | | idle | idle+ | | | | |
| ODU flex+ | | | | | | | |
| MP | | | | | | | |
| TSO | TSO | TSO | TSO+ | TSO+ | TS | TS | TS |
| HO-ODU | | | | | | | |

Fig. 7d

| client data | | | | | | | |
|---|---|---|---|---|---|---|---|
| GFP2 | | | idle2 | | | | |
| ODU flex+ | | | | | | | |
| MP | | | | | | | |
| TSO | TSO | TSO | TSO+ | TSO+ | TS | TS | TS |
| HO-ODU | | | | | | | |

METHOD FOR DATA TRANSMISSION IN AN OPTICAL TRANSPORT NETWORK

BACKGROUND OF THE INVENTION

The invention is based on a priority application EP 09425094.1 which is hereby incorporated by reference.

The invention relates to data transmission in an optical transport network.

From the telecommunication standard ITU-T G.709 (03/2003) a method for transporting data using frame structures is known. This method is described hereby in more detail. The standard ITU-T G.709 is hereby included in the disclosure of this specification.

According to this method a client signal is mapped into a single frame structure of fixed size. The frame structure provides a certain data rate to the client. The provided data rate corresponds to the size of the frame structure. In order to provide a higher data rate to the client a multiplexing method is performed using a whole numbered multiple of the fixed size frame structure. The client signal is mapped into these multiple frame structures of fixed size and these frame structures are multiplexed by bytewise interleaving into a frame structure of higher order.

SUMMARY OF THE INVENTION

The invention provides a method for data transmission in an optical transport network. The method is performed by carrying out certain steps. At a first step client data coming from a client is received. At a second step the client data is mapped into a frame structure ODU-flex. At a third step the frame structure ODU-flex is mapped into tributary slots TS of a data transport structure HO-ODU. At a fourth step the data transport structure HO-ODU is transmitted over an optical transport network OTN. The data transport structure HO-ODU contains a fixed number of tributary slots TS and wherein the size of the frame structure ODU-flex is selectable in granularity of the tributary slots TS of the data transport structure HO-ODU.

The invention provides the advantage that due to the fact that the size of the frame structure ODUflex is selectable in granularity of the tributary slots TS of the data transport structure HO-ODU also the data rate of the client corresponding to the frame structure ODUflex is selectable in granularity of the tributary slots TS of the data transport structure HO-ODU.

BRIEF DESCRIPTION OF THE DRAWINGS

Some embodiments of devices and/or methods in accordance with embodiments of the present invention are now described, by way of example only, and with reference to the accompanying drawings, in which:

FIGS. 7 and 8 illustrated methods of adapting the size of the frame structure.

FIG. 1 illustrates a method of transporting data using a frame structure according to the standard ITU-T G.709. A client 1 generates client data 11, which is mapped 2 into a frame structure ODU (Optical Data Unit). The method of mapping 2 is also known as a 'digital wrapper'. According to the standard, the used frame structures are of a certain, fixed size. According to the standard one may choose a frame structure called 'ODU1', providing a data rate of approximately 2.5 Gbit per second, a further frame structure called 'ODU2' of an approximate data rate of 10 Gbit per second or even another frame structure called 'ODU3' with an approximate data rate of 40 Gbit per second. Such frame structures are then used for transport of data preferably over a network of the type OTN (Optical Transport Network).

FIG. 2 shows the general structure of such a frame structure ODU according to the standard ITU-T G.709. The frame structure ODU contains a payload PL into which the client data 11 is mapped. Furthermore, the frame structure ODU contains an overhead section OH. Into this overhead section OH additional overhead information relevant for transport information may be included. Preferably, a frame structure ODU contains furthermore a data view for information of tandem connection monitoring TCM, as well as further overhead information OH OPU.

In the case that a certain client data rate is admitted to the client this data rate may for instance be the data rate of an ODU1 frame structure at 2.5 Gbit per second. In such a case, the client's data is mapped into one single frame structure. According to the standard the frame structure ODU may be transmitted over an optical transport network OTN. This transmission is then preferably performed by mapping the frame structure ODU into an optical transport unit OTU which itself then is transported over the optical transport network OTN.

Figure 1:
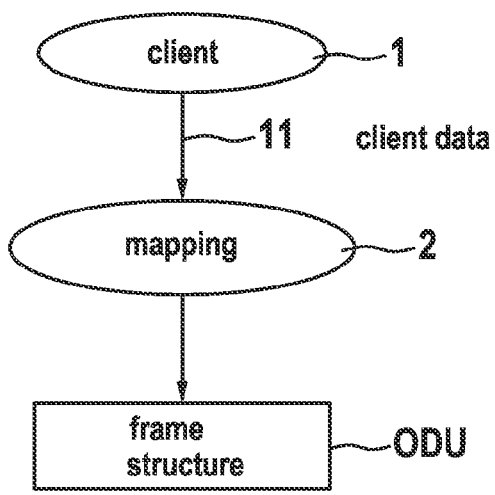
FIG. 1 illustrates a method of mapping client data into a frame structure according to the standard ITU-T G.709.
Figure 2:
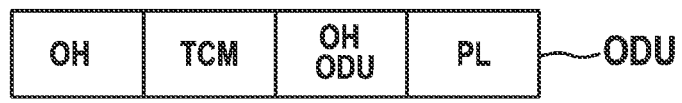
FIG. 2 illustrates a frame structure according to the standard ITU-T G.709.
Figure 3:
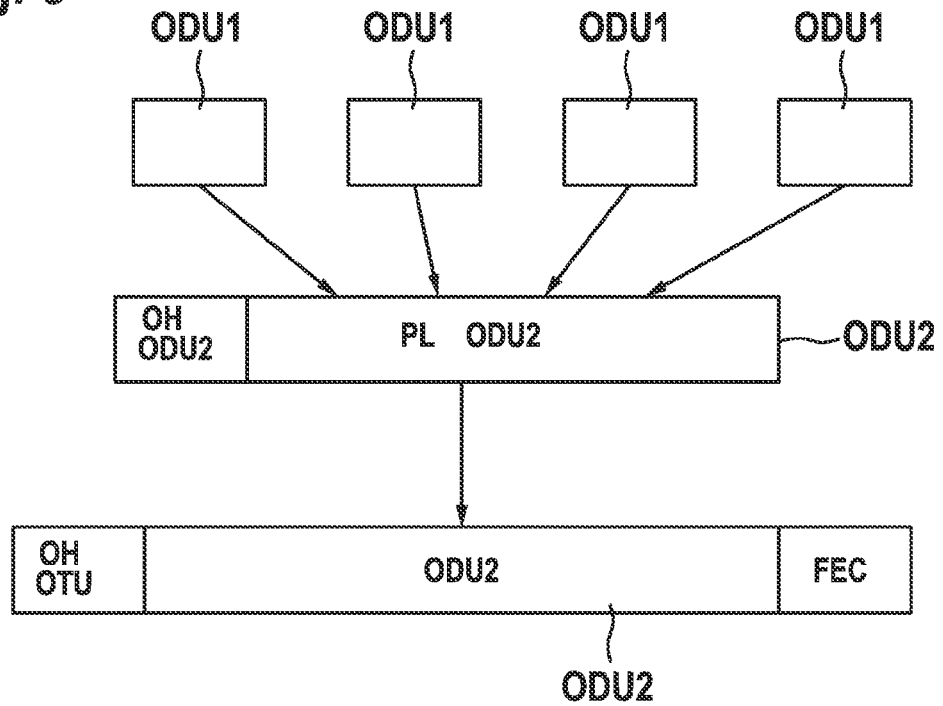
FIG. 3 illustrates a step multiplexing of frame structures according to the standard ITU-T G.709.

In the case that client data from a client shall be received, mapped and then transmitted at a data rate higher than the smallest data rate possible according to the standard, which is 2.5 Gbit per second using an ODU1, a method of multiplexing according to the standard ITU-T G.709 illustrated by FIG. 3 is illustrated. FIG. 3 shows the multiplexing of fixed sized frame structures ODU1 into a frame structure of larger size ODU2. If it is desired to transmit the client data in one single frame structure at a data rate higher then 2.5 Gbit per second, the data rate of the ODU1, the next highest data rate possible according to the standard is 10 Gbit per second, which is the data rate of the ODU2. The multiplexing of the single ODU1 frame structures is performed in the way that the the ODU1 frame structures are multiplexed into the payload section of the next largest frame structure ODU2 according to the standard, which is the ODU2. The multiplexing is performed by bytewise interleaving of the smaller frame structures ODU1 into the next largest frame structure ODU2. A transmission of the frame structure resulting from the multiplexing ODU2 is then embedded into an optical transport unit OTU2 for transportation over an optical transport network OTN. The optical transport unit OTU2 contains an overhead section OH OUT and a section for forward error correction FEC.

For transporting client data in a single frame structure one may choose according to the standard the frame structures ODU1, ODU2, ODU3 or larger frame structures providing data rates of 2.5 Gbit per second, 10 Gbit per second, 40 Gbit per second or higher data rates.

DESCRIPTION OF EMBODIMENTS

The invention is based on the idea that when transporting client data of a client using a single frame structure over an optical transport network OTN, this single frame structure has a selectable size such that the resulting data rate corresponding to the size of to the single frame structure is of sufficient granularity.

The client data may preferably belong to a logical channel of client data provided via a physical client interface. Preferably, the client data signal may be assigned to a logical channel by analysis of a virtual local area network tag VLAN-TAG. As an alternative to the virtual local area network tag any other kind of flow tag may be included in the client data for enabling such an assignment. Preferably, the tag attached to the client data is analysed in order to determine that kind of client data which belongs to a logical channel and which shall be mapped into a single frame structure.

Figure 4:
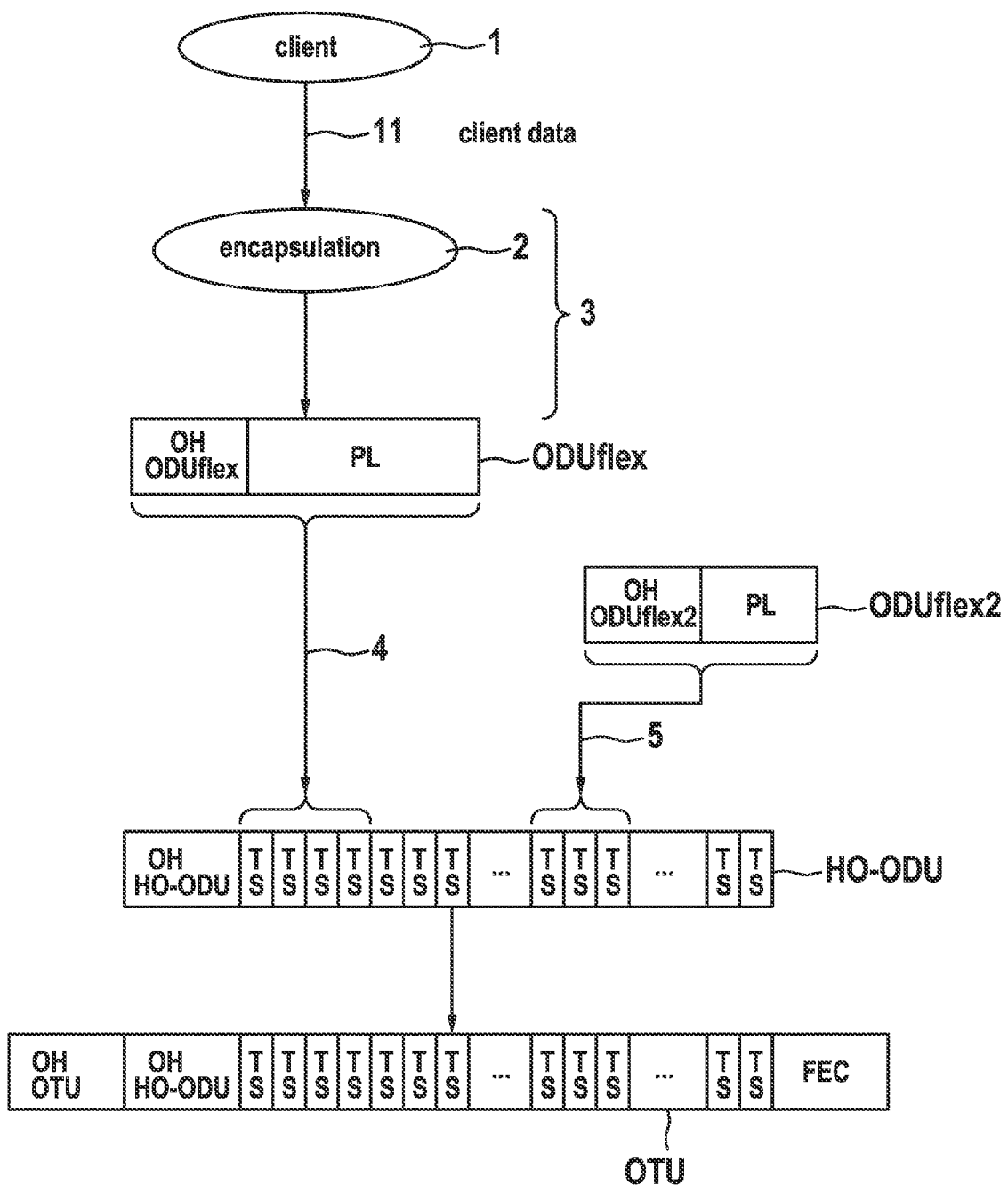
FIG. 4 illustrates a method of mapping client data into a frame structure and mapping of the frame structure into a data transport structure according to a first embodiment.

FIG. 4 illustrates the method for data transmission of a client data in an optical transport network. A client 1 provides client data 11 at a committed bit rate which is received and mapped via a mapping procedure 3 into a frame structure ODUflex. The step of mapping 3 the client data may preferably include a substep of encapsulation 2 of the client data. The frame structure ODUflex contains a payload section PL into which the client data is mapped, as well an overhead section OH ODUflex. Furthermore, the frame structure ODUflex may contain further sections for further overhead such as tandem connection monitoring. The frame structure ODUflex is then mapped via mapping procedure 4 into tributary slots TS of a data transport structure HO-ODU. The data transport structure HO-ODU is of fixed size and contains a fixed number of tributary slots TS. Such data transport structure HO-ODU is preferably of the type ODU1, ODU2, ODU3 or other structures as defined by the standard ITU-T G.709. The data transport structure HO-ODU furthermore contains an overhead section OH HO-ODU. The data transport structure HO-ODU is then embedded into an optical transport unit OTU, which contains an overhead section OH OTU and a further section for forward error correction FEC. The transportation of the data transport structure HO-ODU is performed by transmitting the optical transport unit OTU over the optical transport network OTN from a first client providing the client data to a receiving client. The transmission is carried out by the optical transport network wherein switching devices of the optical transport network OTN perform time switching of the tributary slots TS.

When mapping the frame structure ODUflex via the mapping procedure 4 into the data transport structure HO-ODU the mapping takes place such that the frame structure ODU-flex is mapped into the tributary slots TS of the data transport structure HO-ODU.

The size of the frame structure ODUflex is not of fixed size but of variable size and can be selected in granularity of the tributary slots TS of the data transport structure HO-ODU. By allowing this, it is achieved, that the size of the frame structure ODUflex and therefore the data rate of the client data may be selected in granularity of the size of a single tributary slot TS of the data transport structure HO-ODU. Thus, the frame structure ODUflex allows for mapping of client data at a data rate into one single frame structure, wherein the data rate is not bounded in terms of quantization to a whole numbered multiple of the data rate of a predefined, fixed sized frame structure, such as an ODU1 for instance.

Preferably, further frame structures ODUflex2 are mapped via a mapping procedure 5 into further tributary slots of the data transport structure HO-ODU. By allowing the mapping of different frame structures of different sizes into a data transport structure HO-ODU, wherein the size of each frame structure may vary in granularity of the mentioned tributary slots TS, it is achieved to provide data transport of different client data at different data rates at a granularity which is not achieved according to the standard ITU-T G.709. Preferably, the data rate provided by one single tributary slot TS is 1.25 Gbit per second.

Figure 5:
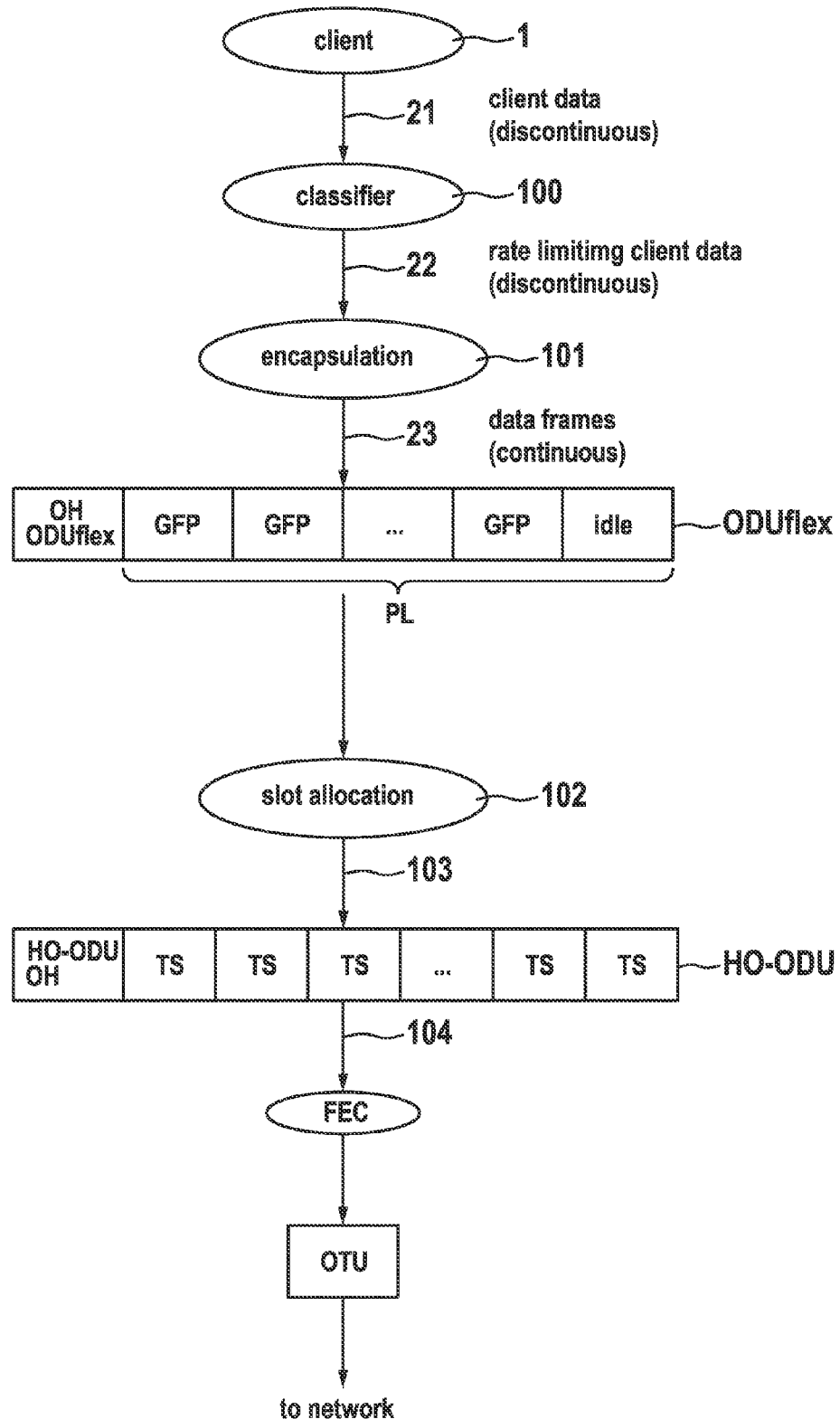
FIG. 5 illustrates a method of mapping client data into a frame structure and mapping of the frame structure into a data transport structure according to a further embodiment.

FIG. 5 illustrates a further embodiment of the method for data transmission in optical transport network. According to FIG. 5 the client 1 provides client data 21 at a discontinuous data rate. Such client data may be data originating from an Internet Protocol IP, Asynchronous Transformer Mode ATM, Ethernet traffic, voice applications or video applications. The discontinuous client data 21 is modified by classifier 100. The classifier identifies a tag attached to the client's data in order to assign the client's data to a logical channel, meaning that the client data with a certain tag shall be mapped lateron into one single frame structure ODUflex. Furthermore, the classifier applies rate limiting to the discontinuous client data. The limited client data 22, which is at a discontinuous data rate, is then encapsulated 101 into data frames 23. Such encapsulation is performed by bytewise mapping of client data into data frames. Such a method of encapsulation my preferably be carried out by a generic framing procedure GFP. The data frames 23 coming at a continuous data rate or then mapped into the frame structure ODUflex. In the case that the data frames 23 are received at a continuous data rate which is smaller than the data rate provided by the frame structure ODUflex the payload section PL of the frame structure ODU-flex may be filled with idle data IDLE. At the next step of slot allocation 102 the number of tributary slots TS necessary for mapping the payload PL of the frame structure ODUflex into the data transport structure HO-ODU is determined. After the step of slot ALlocation 102 the frame structure ODUflex is then mapped by a mapping procedure 103 into the data transport structure HO-ODU as previously described according to FIG. 4. At a next step of forward error correction 104 additional data is determined, preferably using a Reed-Solomon or a Hamming-Code. Adding the additional data from the forward error correction 104 and also a further overhead sections, the optical transport unit OTU is provided for transportation over the optical transport network OTN.

According to a further embodiment the method includes
  receiving a logical client data via a physical interface
  mapping the client data into a frame structure with variable size ODUflex
  mapping the frame structure with variable size ODU-flex into an adequate number of tributary slots TS of a data transport structure HO-ODU, allowing dynamic resizing of the frame structure with variable size ODU-flex and the number of tributary slots reallocation without losing client data traffic
  transmitting the data transport structure HO-ODU.

The data transport structure HO-ODU contains a fixed number of tributary slots (TS) and the size of the frame structure (ODU-flex) is selectable in granularity of the tributary slots (TS) of the data structure (HO-ODU).

Figure 6:
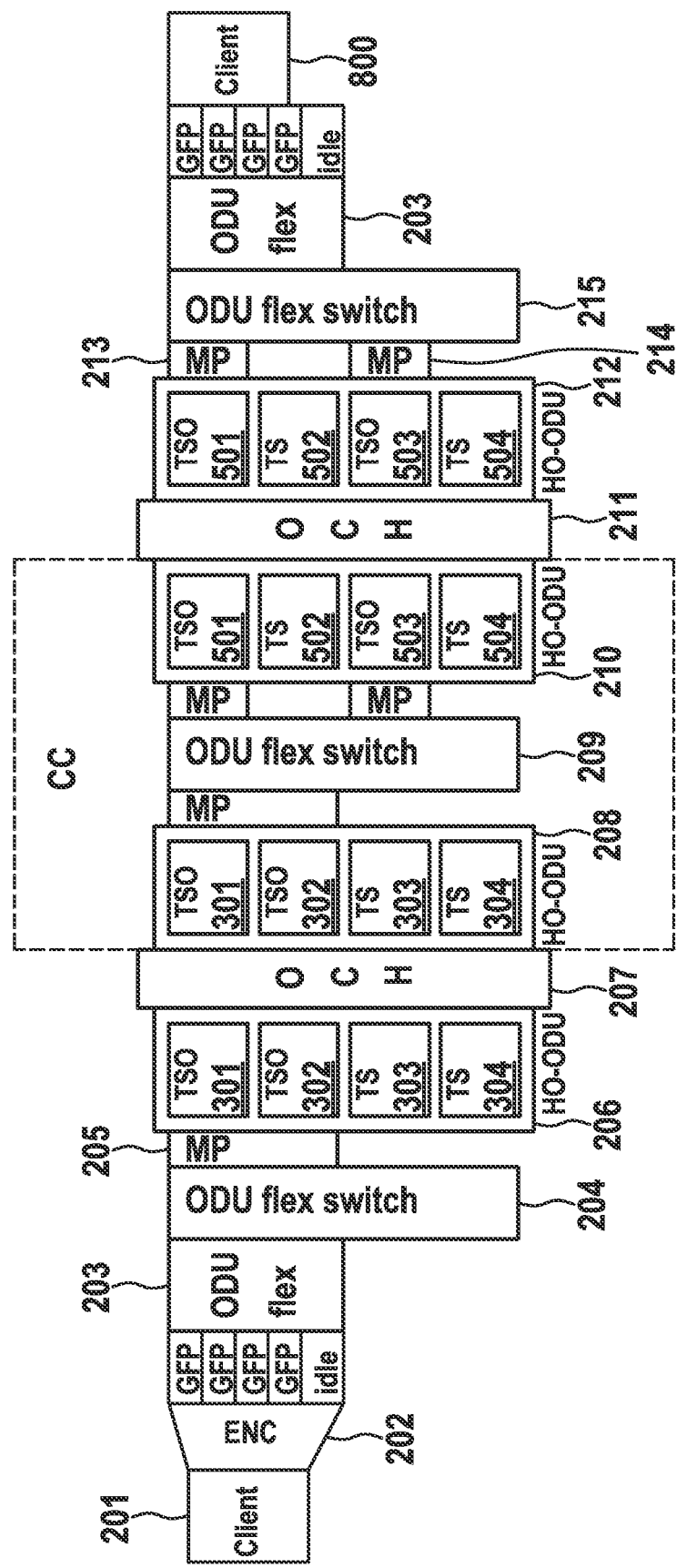
FIG. 6 illustrates a method of mapping client data into a frame structure and transmitting the frame structure over an optical transport network according to an embodiment.

FIG. 6 illustrates an even further embodiment of the method. FIG. 6 illustrates the mapping of the client data into the frame structure ODUflex, the mapping of the frame structure ODUflex into tributary slots TS of the data transport structure HO-ODU and the transmission of the data transport structure HO-ODU via time switching of the tributary slots TS carried out by switching devices 204, 209, 215, CC of an optical transport network OTN. Data from a client 201 is encapsulated by encapsulation step 202 into data frames GFP and mapped into a frame structure 203. Preferably idle data IDLE is added to the data frames GFP in order to totally fill the data capacity of the frame structure 203. The switching device 204 performs mapping maps 205 of the frame structure 203 into the tributary slots 301, 302 of the data transport structure 206.

In order to illustrate the principle of time switching of the tributary slots of a data transport structure more easily, the step of adding further overhead and data of forward error correction to a data transport structure HO-ODU in order to obtain an optical transport unit OTU is not included and not displayed in FIG. 6. The data transport unit 206 may contain further tributary slots 303, 304, which are not occupied by the frame structure 203. The tributary slots 301-304 of the data transport structure 206 are then transmitted over an optical channel 207 to a switching device CC. At the input section of the switching device CC the tributary slots containing the frame structure 301,302 are switched by a switching device 209, into the tributary slots 501, 503 of an outgoing data transport structure 210 at the output section of the switching device CC. Thus the allocation of tributary slots 501, 503 of the data transport structure 210 at the output section of the switching device CC may be different to the slot allocation of the initially received data transport structure 206. The data transport structure of new slot allocation 210 is then transported over the optical channel 211. After reception of the data transport structure 212 the tributary slots containing the frame structure 501, 503 are mapped by a mapping procedure 213, 214 via a switching device 215, which is preferably in agnostic matrix, in such a way that the initial frame structure 203 is reconstructed. Using the data frames GFP contained in the frame structure 203 the client data of the initial client 201 is then reconstructed and provided to the receiving client 600.

It is to be understood, that in order to transport the client data from the initial client 201 to the receiving client 600 properly, the elements performing the time switching along the optical transportation network have to agree upon such time switching, that the frame structure 203 can be reconstructed properly at the receiving side. Therefore, the mapping of the frame structure ODUflex into the tributary slots TS and the slot allocation performed by the switching devices 204, 209, 215 has to be agreed upon before starting transportation of the frame structure 203.

According to a further embodiment the method for data transmission in an optical network contains the step of adapting the size of the frame structure ODUflex in dependence on an agreed limited data rate. This adaption is carried out by certain substeps. The first substep is that of choosing an allocation of tributary slots TS in the data transport structure HO-ODU for mapping of a size-adapted frame structure ODUflex. The second substep is that of signaling the chosen allocation of tributary slots TS to those switching devices, which are taking part in the data transmission in the optical network. The third step is that of adapting the size of the frame structure ODUflex. Preferably, after adapting the size of the frame structure ODUflex a new limited data rate corresponding to the size of the size-adapted frame structure ODUflex is signaled to the client. Thus the client is informed that he may increase his data rate to the new limited data rate and that his data at the new limited data rate can be properly transported over the optical transport network.

FIGS. 7a, 7b, 7c and 7d illustrate steps of the method for adapting the size of the frame structure ODUflex. Illustrated are the steps performed when incrementing the size of frame structure ODUflex and thus increasing also the data rate allowed to the client.

FIG. 7a shows a configuration before changing the size of the frame structure and thus increasing the data rate of the client. According to FIG. 7a the client data is encapsulated in data frames GFP preferably filled up with idle data IDLE to form the data of the frame structure ODUflex which then is mapped by a mapping procedure MP onto tributary slots TSO of a data transport structure HO-ODU. The data transport structure contains further tributary slots, which are not yet allocated to the frame structure TS. After agreeing with all switching devices of the optical transport network on a new slot allocation of tributary slots of the data transport structure HO-ODU, the next step of the method according to FIG. 7b can be approached. In this next step, additional tributary slots TSO+ are allocated within the data transport structure HO-ODU. At this step of the method these additional tributary slots TSO+ are filled with stuffing data by the mapping procedure MP STUFFING. At the next step of the method illustrated in FIG. 7c the size of the frame structure ODUflex is increased such that a mapping MP of the frame structure ODUflex fills the initial tributary slots TSO and the additional tributary slots TSO+. The data rate of the client data is still kept at the same data rate as at the beginning of the method. The additional data capacity in the frame structure ODUflex+ is at first filled with additional idle data IDLE+. At the next step in FIG. 7d the client is allowed the increase the data rate according to the size of the size-adapted frame structure ODUflex resulting in a new data capacity represented in FIG. 7d by a new amount of data frames GFP2. Preferably, data capacity not occupied by the client data at the new allowed data rate is filled by further idle data IDLE2.

FIG. 8 shows the steps which are performed in the case that the size of the frame structure ODUflex and thus the client data rate is decreased.

Figure 8A:
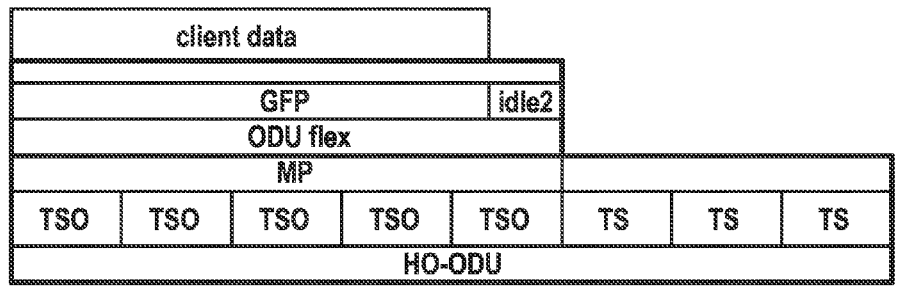
Figure 8B:
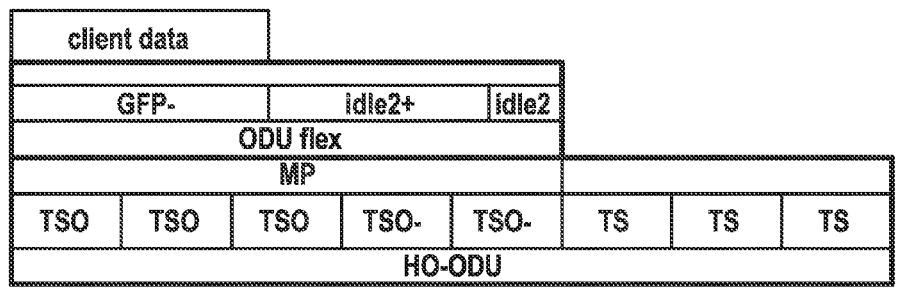
Figure 8C:
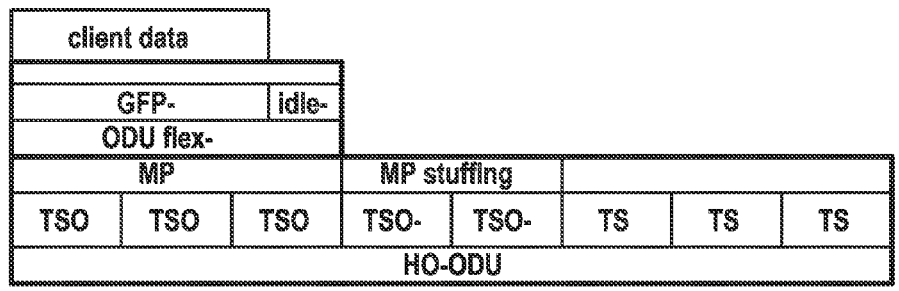
Figure 8D:
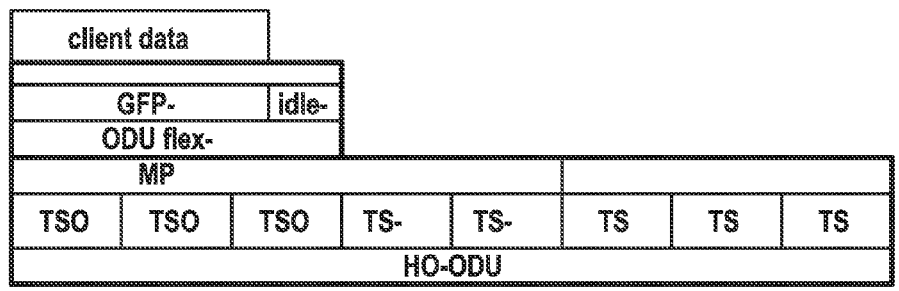

At an initial step according to FIG. 8a the data rate of the client and thus the size of the frame structure ODUflex is such that it occupies a number of tributary slots TSO in the data transport structure HO-ODU. After agreeing with the switching devices of the optical transport network on a changed allocation of tributary slots TSO, TSO− for mapping of the frame structure ODUflex, the step illustrated in FIG. 8b is performed. In this step the client data is reduced such that the amount of data frames resulting from encapsulation of the client data is also reduced GFP−. At this step the size of the frame structure is kept unchanged, but the data capacity set free due to the decrease of the client's data.

The decreased data capacity occupied by the data frames GFP− is filled with further idle data IDLE2+. At the next step illustrated in FIG. 8c the size of the frame structure is reduced ODUflex− setting free tributary slots TSO− which are not occupied by the reduced frame structure TSO−. These tributary slots TSO− are filled with stuffing data MP stuffing by the mapping procedure. At the next step illustrated in FIG. 8d those tributary slots TS− not allocated anymore by the frame structure TS− are allocated for the purpose that they may be used for transport of other data.

Figure 9:
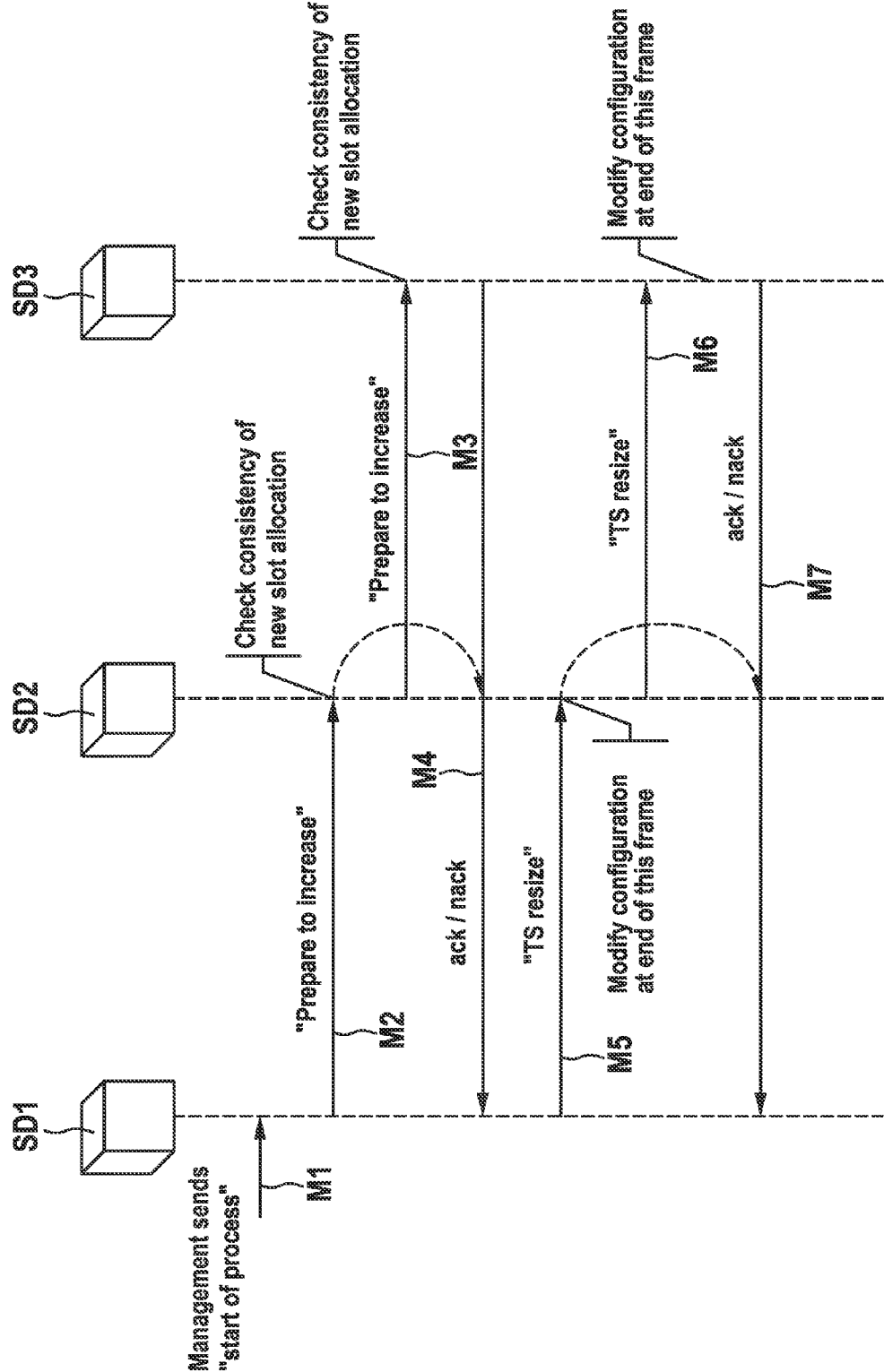
FIGS. 9 and 10 illustrate a method of signaling in the optical transport network for size-adaption of the frame structure.
Figure 10:
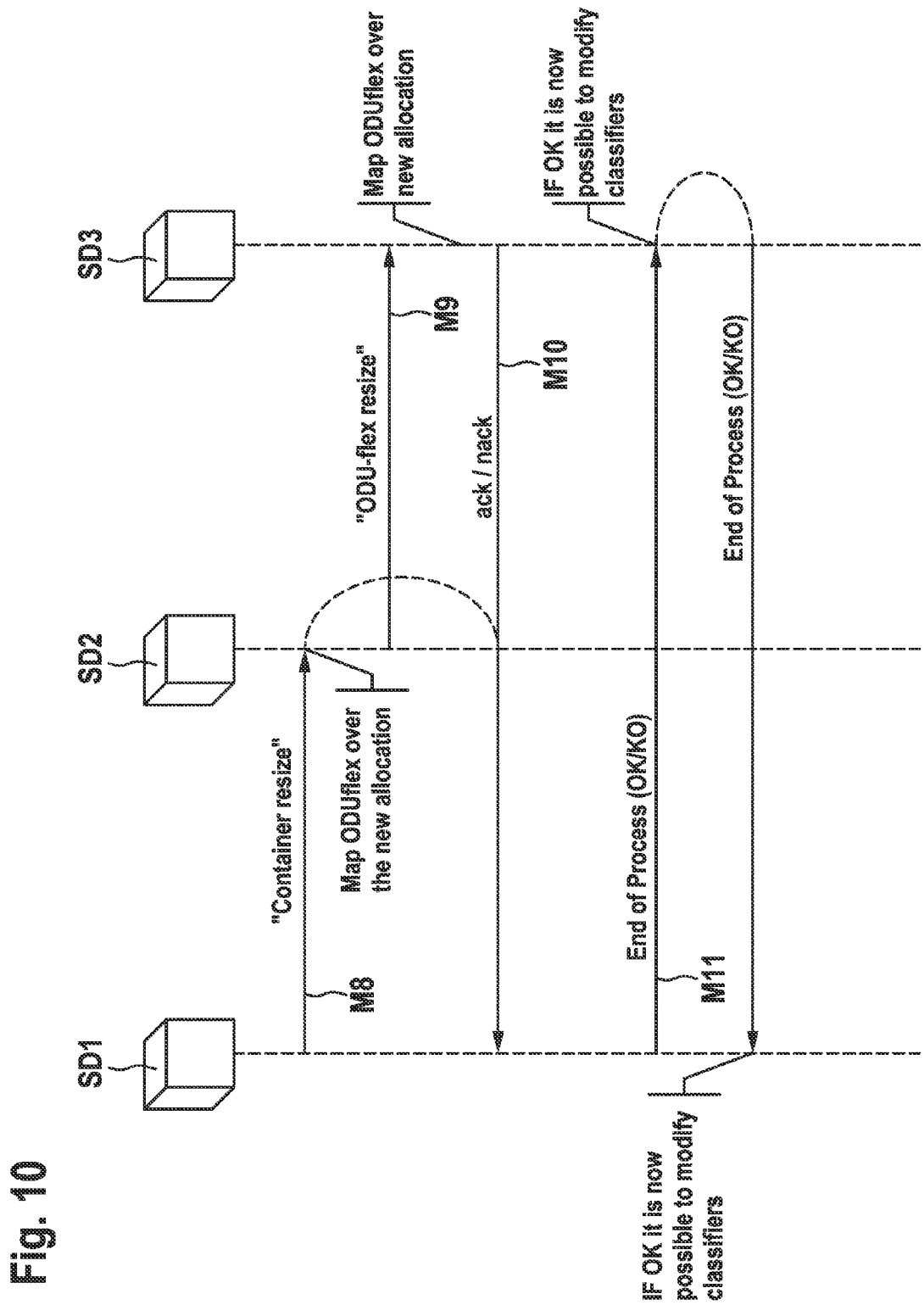

FIG. 9 and FIG. 10 illustrate the step of signaling to the switching devices of a network a requested change of slot allocation in order to adapt the size of the frame structure. For the purpose of increasing the data rate a control or a management plane sends a first signal M1, M2, M3 for the start of the process to those switching devices taking part in the data transport SD1, SD2, SD3. This first message signals to the switching devices that they shall prepare to increase the data rate for the data transport by allocating additional tributary slots for the purpose of increasing the data rate. The affected switching devices SD1-SD3 pre-allocate additional tributary slots. The switching devices are signaling then signaling back a backward message M4 to the control or management plane in the case that they can provide a new consistent mapping of tributary slots as desired. In the case that one of the switching devices is not able to provide a consistent slot allocation and mapping of new additional tributary slots an information of not acknowledging the allocation of tributary slots and/or the mapping is included in the backward message M4.

In case all switching devices have agreed upon a new consistent mapping of tributary slots and have sent back the acknowledgement messages, the control or management plane sends a modification message M5 through the network to the switching devices such that the switching devices upon reception of the modification message modify the configuration of the allocation and mapping of the tributary slots. The switching devices acknowledge the new mapping of tributary slots by sending back a further backward message M7 to the control or management plane. In the case that one of the switching devices is not able to modify the configuration of the mapping of the tributary slots as desired the switching device includes in the further backward message M7 an information of not acknowledging this mapping.

As a next step the control or management plane sends a size-changing message M8, M9 through the network to all switching devices. This information of changing the size of the frame structure ODUflex is incorporated within the last frame structure being sent at that the initial size. After receiving this notification the switching devices change the configuration as desired in order to transport the next received frame structure of the new size with proper slot allocation and mapping of the tributary slots. A successful change of the configuration by the switching devices via changing the size of the frame structure is signals back by a third backward message M10 to the management or control plane. Also in this case that any of the switching devices is not able to successfully change the configuration as desired this third backward message M10 may contain an information that a switching device does not acknowledge the desired change of size of the frame structure.

As a next step the management or control plane sends a final message M11 through the network to the switching devices. This final message indicates that the process of increasing the size of the frame structure is successfully performed. Switching devices of the network being connected to classifiers for receiving client data and rate-limiting will then notify the classifiers that an increase of the data rate of the client may be permitted. Upon this notification the classifiers inform the clients that they are allowed to send data at a new limited data rate. In addition to this, the classifiers will change the rate limiting allowing the new data rate.

FIGS. 9 and 10 illustrate a method of signaling when increasing the size of the frame structure and increasing the data rate in granularity of the tributary slots of the data transport structure as previously described in FIG. 7.

A similar method of signaling for the purpose of decreasing the size of the frame structure and decreasing the data rate allowed to the client for sending the client data 8 may be anticipated in a similar way.

Figure 11:
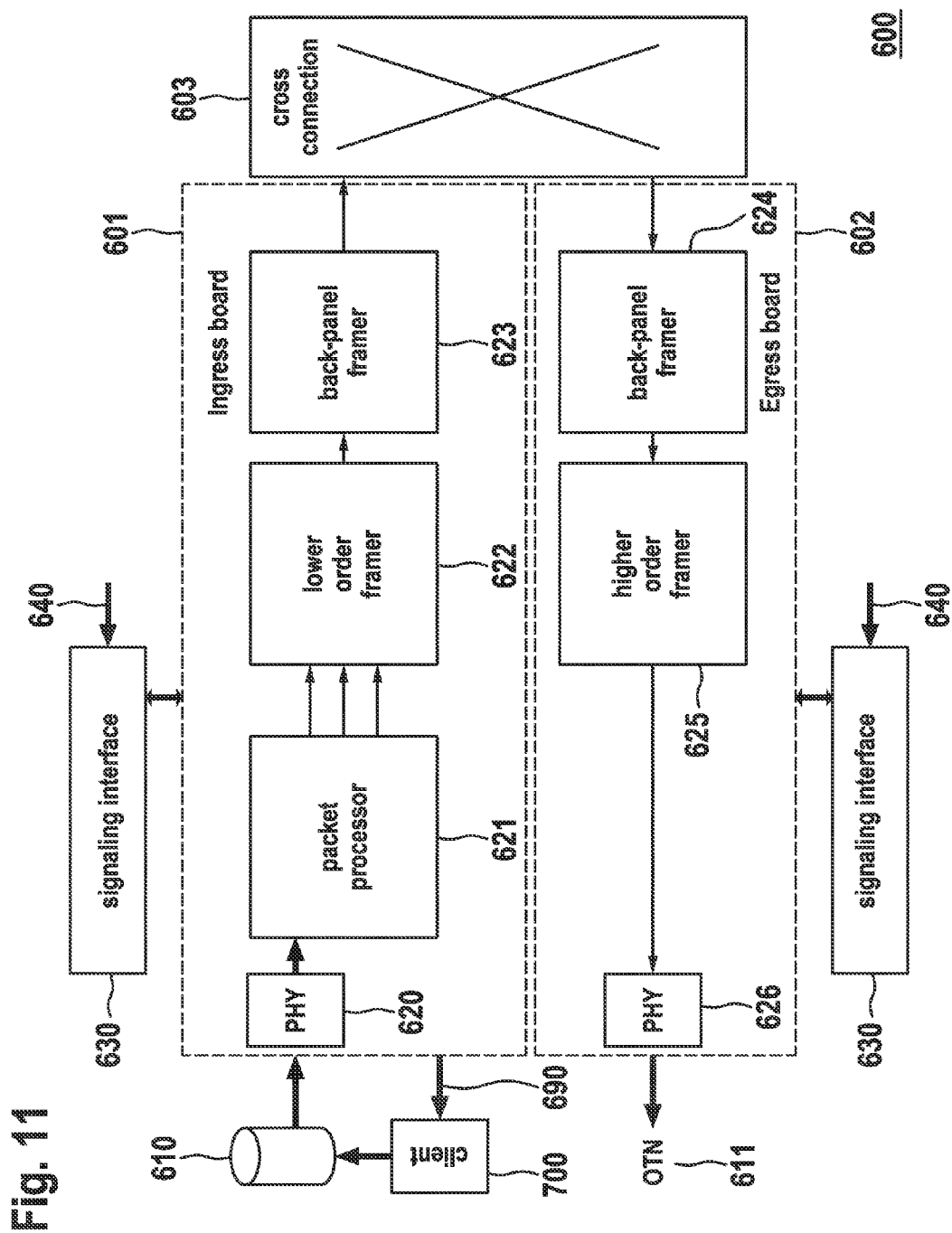
FIG. 11 illustrates a network device according to an embodiment.

FIG. 11 illustrates a proposed network device according to a first embodiment. The Network device 600 contains a first physical interface 620 for receiving client data 610 a lower order framer 622 for generating a frame structure ODUflex and mapping the client data into the frame structure ODUflex, a higher order framer 625 for generating a data transport structure HO-ODU containing a fixed size of tributary slots TS and for mapping of the frame structure ODUflex into the data transport structure HO-ODU and a second physical interface 626 for transmitting the data transport structure HO-ODU towards the optical transport network OTN.

The lower order framer 622 is adapted to select the size of the frame structure ODUflex in granularity of the tributary slots TS of the data transport structure HO-ODU.

The network device 600 contains furthermore a packet processor 621 for limiting the data rate of the client data 610 to a limited data rate as well as for preferably identifying a tag, preferably a VLAN tag, attached to the client data. By identifying the tag, the packet processor 621 is able to decide which kind of received client data 610 is associated to a logical channel of the client. The client data which is associated to the logical channel is then that kind of client data which shall be mapped into the frame structure ODUflex. The lower order framer 622 encapsulates the rate-limited client data into data frames GFP, generates the frame structure ODUflex and maps the data frames GFP into the frame structure ODUflex.

Preferably, the first physical interface 620, the packet processor 621 and the lower order framer 622 are arranged on an ingress board 601 along with a back-panel framer 623. The back panel framer 623 receives the frame structure ODUflex from the lower order framer 622 and transmits the frame structure ODUflex towards a switching device 603 at an internal data format. The connection switching device 603 then switches the frame structure ODUflex towards a second back-panel framer 624 of an egress boards 602 of the network device 600. Preferably, the switching device 603 is connected to a multiple number of ingress boards and egress boards for switching signals between these boards.

The second back panel framer 624 reconstructs the frame structure ODUflex using the internal data format and passes the frame structure towards the higher order framer 625 which is also located on the egress board 602. The higher order framer 625 generates the data transport structure HO-ODU containing a fixed number of tributary slots TS, allocates a number of tributary slots TS within the data transport structure HO-ODU and maps the frame structure onto the allocated tributary slots TS. The higher order framer 625 then passes the data transport structure HO-ODU on to the second physical interface 626 also located on the egress board 602. Preferably, the higher order framer embeddes the data transport structure HO-ODU into additional overhead OH HO-ODU and data for forward error correction FEC before passing it on to the second physical interface 626. The physical interface 626 then transmits the data transport structure HO-ODU towards the optical transport network 611.

In order to operate in accordance with an embodiment of the described method the network device 600 further contains a signaling interface 630 for receiving a request signal 640 from a control- or a management plane of the transport network OTN. The signaling interface 630 then signals towards the higher order framer 625 of the egress board 602 that a modified number of tributary slots of the data transport structure HO-ODU is demanded for transport of a frame structure ODUflex of an adapted size. The higher order framer 625 is adapted to choose a modified allocation of tributary slots TS in the data transport structure HO-ODU for transport of a frame structure ODUflex of an adapted size. The higher order framer 625 does so upon receiving signaling from the signaling interface 630. Upon receiving signaling from the signaling interface 630 the lower order framer 622 changes the size of the frame structure ODUflex in granularity of the tributary slots TS resulting in a size-adapted frame structure ODUflex. The size-adapted frame structure ODUflex is then mapped by the higher order framer 625 onto the allocated tributary slots.

After changing the size of the frame structure the packet processor 621 receives a signal from the control- or management plane via the signaling interface 630 upon which the packet processor adapts the limited data rate to a new limited data rate corresponding to the size-adapted frame structure. The new limited data rate is then signaled via a data rate signal 690 to the client 700.

The abbreviations used in this specification have been applied for optical transport networks as known from the standard ITU G.709. However, the specification is not limited to an optical transport network according to ITU G.709 but may refer to optical transport networks having similar frames structure as well.

The invention claimed is:

1. A method for data transmission in an optical transport network, comprising the steps of:
   receiving client data from a client;
   mapping said client data into a frame structure;
   mapping said frame structure into tributary slots of a data transport structure;
   adapting the size of said frame structure in dependence on an agreed limited data rate by
      signaling to switching devices a change of allocation of said tributary slots;
      choosing an allocation of tributary slots in said data transport structure for mapping of a size-adapted frame structure; and
      adapting said size of said frame structure in granularity of said tributary slots resulting in said size-adapted frame structure; and
   transmitting said data transport structure;
   wherein said data transport structure contains a fixed number of tributary slots; and
   wherein a size of said frame structure is variable and selectable in granularity of said tributary slots of said data transport structure.

2. The method according to claim 1, wherein the step of transmitting said data structure further comprises time switching of said tributary slots carried out by said switching devices of said optical transport network.

3. The method according to claim 1, further comprising the step of signaling to said client a new limited data rate corresponding to said size adapted frame structure.

4. The method according to claim 1, wherein said receiving of said client data further comprises rate limiting of said client data resulting in rate-limited client data.

5. The method according to claim 4, wherein said mapping of said client data into said frame structure comprises the steps of:
   mapping of said rate-limited client data into encapsulation layer frames; and
   mapping of said encapsulation layer frames into said frame structure.

6. The method according to claim 5, further comprising the step of mapping idle data into those tributary slots of said frame structure which are not occupied after said mapping of said encapsulation layer frames into said frame structure.

7. A network device for data transmission in an optical transport network, comprising:
   a first physical interface configured to receive client data;
   a lower order framer configured to generate a frame structure and map said client data into said frame structure;
   a higher order frame configured to generate a data transport structure that contains a fixed number of tributary slots and map said frame structure into said data transport structure; and
   a second physical interface configured to transmit said data transport structure towards said optical transport network;
   wherein the size of said frame structure is adapted in dependence on an agreed limited data rate by
      a signaling interface configured to receive a request-signal for a change of allocation of said tributary slots from a control or a management plane of said optical transport network;
      said higher order framer being configured to choose upon reception of said request signal an allocation of tributary slots in said data transport structure for mapping of a size-adapted frame structure; and
      said lower order framer being configured to change said size of said frame structure in granularity of said tributary slots that results in said size-adapted frame structure.

8. A method for data transmission in an optical transport network, comprising the steps of:
   receiving client data from a client;
   mapping said client data into a frame structure;
   mapping said frame structure into tributary slots of a data transport structure; and
   adapting a size of said frame structure in dependence on an agreed limited data rate by
      signaling to switching devices of said optical transport network a change of allocation of said tributary slots;
      choosing an allocation of tributary slots in said data transport structure for mapping of a size-adapted frame structure; and
      adapting said size of said frame structure in granularity of said tributary slots resulting in said size-adapted frame structure.

9. The method according to claim 8, further comprising the step of transmitting said data transport structure.

10. The method according to claim 9, wherein the step of transmitting said data structure further comprises time switching of said tributary slots carried out by said switching devices of said optical transport network.

11. The method according to claim 8, wherein said data transport structure contains a fixed number of tributary slots.

12. The method according to claim 8, wherein a size of said frame structure is selectable in granularity of said tributary slots of said data transport structure.

13. The method according to claim 8, further comprising the step of signaling to said client a new limited data rate corresponding to said size adapted frame structure.

14. The method according to claim 8, wherein said receiving of said client data further comprises rate limiting of said client data resulting in rate-limited client data.

15. The method according to claim 14, wherein said mapping of said client data into said frame structure comprises the steps of:
   mapping of said rate-limited client data into encapsulation layer frames; and
   mapping of said encapsulation layer frames into said frame structure.

16. The method according to claim 15, further comprising the step of mapping idle data into those tributary slots of said frame structure which are not occupied after said mapping of said encapsulation layer frames into said frame structure.

* * * * *